(12) United States Patent
Chen

(10) Patent No.: US 9,976,321 B2
(45) Date of Patent: May 22, 2018

(54) LOCKING STRUCTURE FOR A BICYCLE

(71) Applicant: Sheng Yung Lock Industrial Co., Ltd., Xihu Township, Changhua County (TW)

(72) Inventor: Li-Yu Chen, Xihu Township, Changhua County (TW)

(73) Assignee: SHENG YUNG LOCK INDUSTRIAL CO., LTD., Changhua (TW)

( * ) Notice: Subject to any disclaimer, the term of this patent is extended or adjusted under 35 U.S.C. 154(b) by 0 days. days.

(21) Appl. No.: 15/049,901

(22) Filed: Feb. 22, 2016

(65) Prior Publication Data

US 2017/0029055 A1 Feb. 2, 2017

(30) Foreign Application Priority Data

Jul. 30, 2015 (TW) .............................. 104124820 A

(51) Int. Cl.
| | |
|---|---|
| *E05B 71/00* | (2006.01) |
| *B62H 5/00* | (2006.01) |
| *E05B 67/00* | (2006.01) |
| *E05B 67/06* | (2006.01) |
| *E05B 41/00* | (2006.01) |
| *E05B 45/00* | (2006.01) |
| *E05B 17/10* | (2006.01) |
| *B62H 5/20* | (2006.01) |

(Continued)

(52) U.S. Cl.
CPC ............. *E05B 71/00* (2013.01); *B62H 5/001* (2013.01); *B62H 5/003* (2013.01); *B62H 5/006* (2013.01); *B62H 5/14* (2013.01); *B62H 5/20* (2013.01); *E05B 17/10* (2013.01); *E05B 41/00* (2013.01); *E05B 45/005* (2013.01); *E05B 67/003* (2013.01); *E05B 67/063* (2013.01); *E05B 73/0005* (2013.01)

(58) Field of Classification Search
CPC ...... E05B 67/00; E05B 67/003; E05B 67/006; E05B 71/00; E05B 73/00; E05B 73/0005; E05B 73/0011; E05B 73/0094; B62H 5/00; B62H 5/003
See application file for complete search history.

(56) References Cited

U.S. PATENT DOCUMENTS 3,824,540 A * 7/1974 Smith, II ............... B62H 5/003
116/33
5,889,463 A * 3/1999 Judd ................... B60R 25/1001
340/425.5

(Continued)

*Primary Examiner* — Christopher J Boswell

(57) ABSTRACT

A locking structure for a bicycle contains: a fixing mount, a locking member, and a flexible strap. The fixing mount includes at least one orifice, a recessed portion, and a first connecting portion. The locking member includes a housing in which a lock block and a retaining unit are accommodated, the housing has a second connecting portion for mating with the first connecting portion, and the lock block has a cylinder core and an aperture. The flexible strap includes a coupling bolt arranged on a first end thereof and a loop disposed on a second end thereof. When the coupling bolt inserts into and locks in the aperture, it pushes the retaining unit into the recessed portion to fix the locking member and the fixing mount together, and the coupling bolt inserts through the loop so that the flexible strip forms a positioning ring.

6 Claims, 15 Drawing Sheets

(51) Int. Cl.
*B62H 5/14* (2006.01)
*E05B 73/00* (2006.01)

(56) References Cited

U.S. PATENT DOCUMENTS

| | | | | |
|---|---|---|---|---|
| 6,016,673 A * | 1/2000 | McDaid | ............... | B62H 5/003 224/451 |
| 7,661,280 B1 * | 2/2010 | Weyland | ............... | B62H 5/003 224/425 |
| 8,596,506 B2 * | 12/2013 | Yu | ............... | B62H 5/00 224/419 |
| 8,839,650 B2 * | 9/2014 | Zuraski | ............... | B62H 5/003 70/21 |
| 9,013,301 B2 * | 4/2015 | Williams | ............... | B62H 5/00 340/539.13 |
| 9,102,376 B1 * | 8/2015 | Chang | ............... | B62H 5/001 |
| 9,228,377 B1 * | 1/2016 | Chang | ............... | B62H 5/003 |
| 2015/0204112 A1 * | 7/2015 | Salzmann | ............... | B62H 5/003 70/15 |

* cited by examiner

LOCKING STRUCTURE FOR A BICYCLE

BACKGROUND OF THE INVENTION

Field of the Invention

The present invention relates to a bicycle lock and, more particularly, to a locking structure for a bicycle which is fixed on detachable parts of the bicycle to avoid theft of the detachable parts and the bicycle and to make alert and illumination.

Description of the Prior Art

A bicycle contains a plurality of detachable parts, such as a seat saddle, a front wheel, and a rear wheel which are connected together and are removed easily for maintenance. However, the bicycle is stolen often after disassembling these detachable parts, so locking the bicycle by way of a bicycle lock is required.

A conventional bicycle lock is portable and merely locks wheels of the bicycle, so it is inconvenient to carry the bicycle lock by the user. To overcome such a problem, a removable bicycle lock has been developed. Yet, this removable bicycle lock can only lock one of the detachable parts of the bicycle, and the other detachable parts and the bicycle may be stolen, so extra cost for purchasing additional bicycle locks is inevitable.

To achieve riding safety in the night or in a dimmed condition, a light emitting device is mounted on the bicycle to illuminate lights and make alert, and the light emitting device contains a fixer and a light. The fixer is fixed on a seat post or a handlebar of the bicycle, and a retainer is arranged on a back side of the light to mate with the fixer, such that the light is secured on the bicycle by using the fixer and the retainer. However, such configuration will occupy an installation space and influence an aesthetics appearance. In addition, the light will be stolen.

The present invention has arisen to mitigate and/or obviate the afore-described disadvantages.

SUMMARY OF THE INVENTION

The primary objective of the present invention is to provide a locking structure for a bicycle in which a fixing mount is configured to be selectively fixed on detachable parts of the bicycle, and a locking member is in connection with the fixing mount easily. A flexible strip surrounds two wheels of the bicycle and a fix post to fix the bicycle and the detachable parts and to avoid the theft of the bicycle.

A secondary objective of the present invention is to provide a locking structure for a bicycle in which the fixing mount is fixed on the bicycle saddle and at least one of the two wheels and is connected with or removed from the locking member easily.

A further objective of the present invention is to provide a locking structure for a bicycle in which each of two light assemblies is in connection with the locking member, and the locking member is locked with the fixing mount by using a cylinder core, so that the fixing mount is mounted on the bicycle. Hence, each light assembly makes alert and illuminates lights, and the bicycle is locked by using the locking member and the flexible strip to obtain anti-theft, illumination, and aesthetics appearance.

Another objective of the present invention is to provide a locking structure for a bicycle in which each light assembly is in connection with the locking member to enhance the anti-theft of each light assembly.

To obtain above-mentioned objectives, a locking structure for a bicycle provided by the present invention contains: a fixing mount, a locking member, and a flexible strap.

The fixing mount includes at least one orifice, a recessed portion, and a first connecting portion, and the fixing mount is fixed on detachable parts of a bicycle.

The locking member includes a housing in which a lock block and a retaining unit are accommodated. The housing has a second connecting portion for mating with the first connecting portion, and the housing is connected with the fixing mount by way of the first connecting portion and the second connecting portion. The lock block has a cylinder core and an aperture.

The flexible strap has a predetermined length, and the flexible strap includes a coupling bolt arranged on a first end thereof and a loop disposed on a second end thereof. The coupling bolt inserts into and locks in the aperture of the lock block via the housing. When the coupling bolt inserts into and locks in the aperture, it pushes the retaining unit into the recessed portion of the fixing mount to fix the locking member and the fixing mount together. The coupling bolt of the flexible strip inserts through the loop, so that the flexible strip forms a positioning ring.

DETAILED DESCRIPTION OF THE PREFERRED EMBODIMENTS

Figure 1:
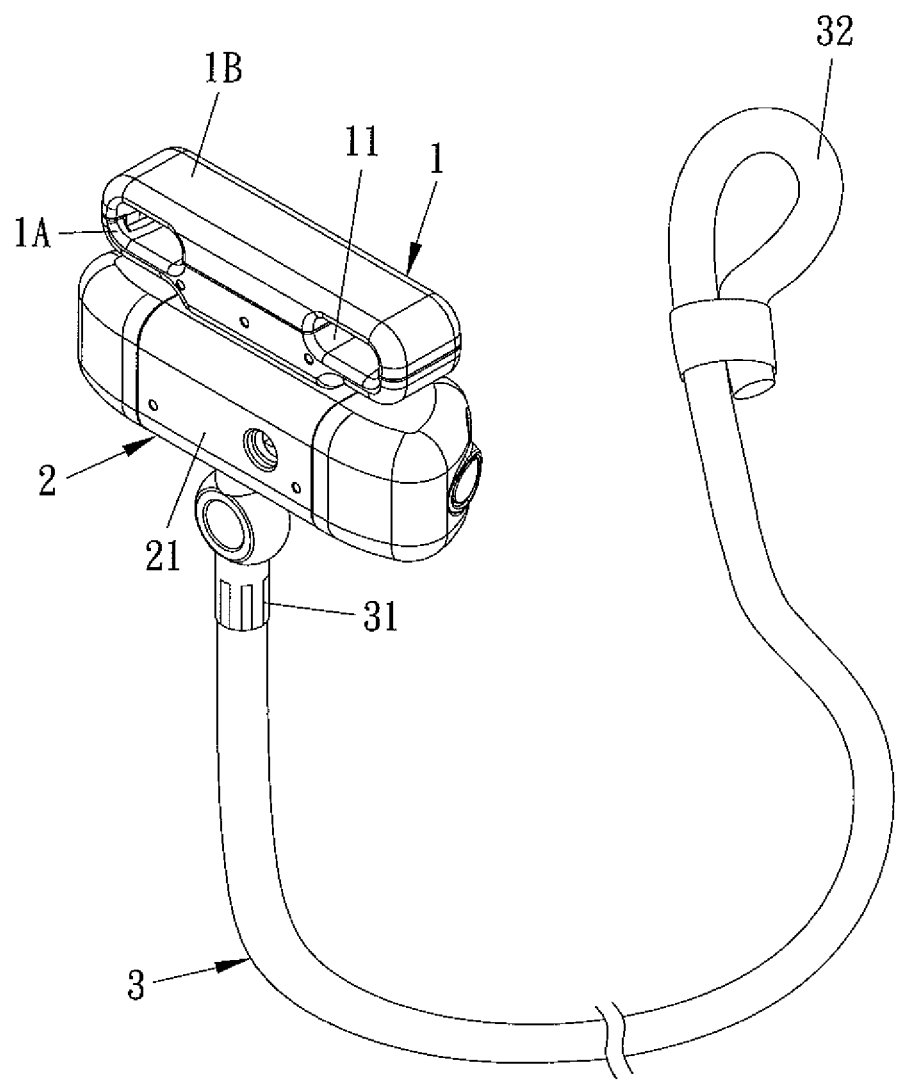
FIG. 1 is a perspective view showing the assembly of a locking structure for a bicycle in accordance with a preferred embodiment of the present invention.
Figure 2:
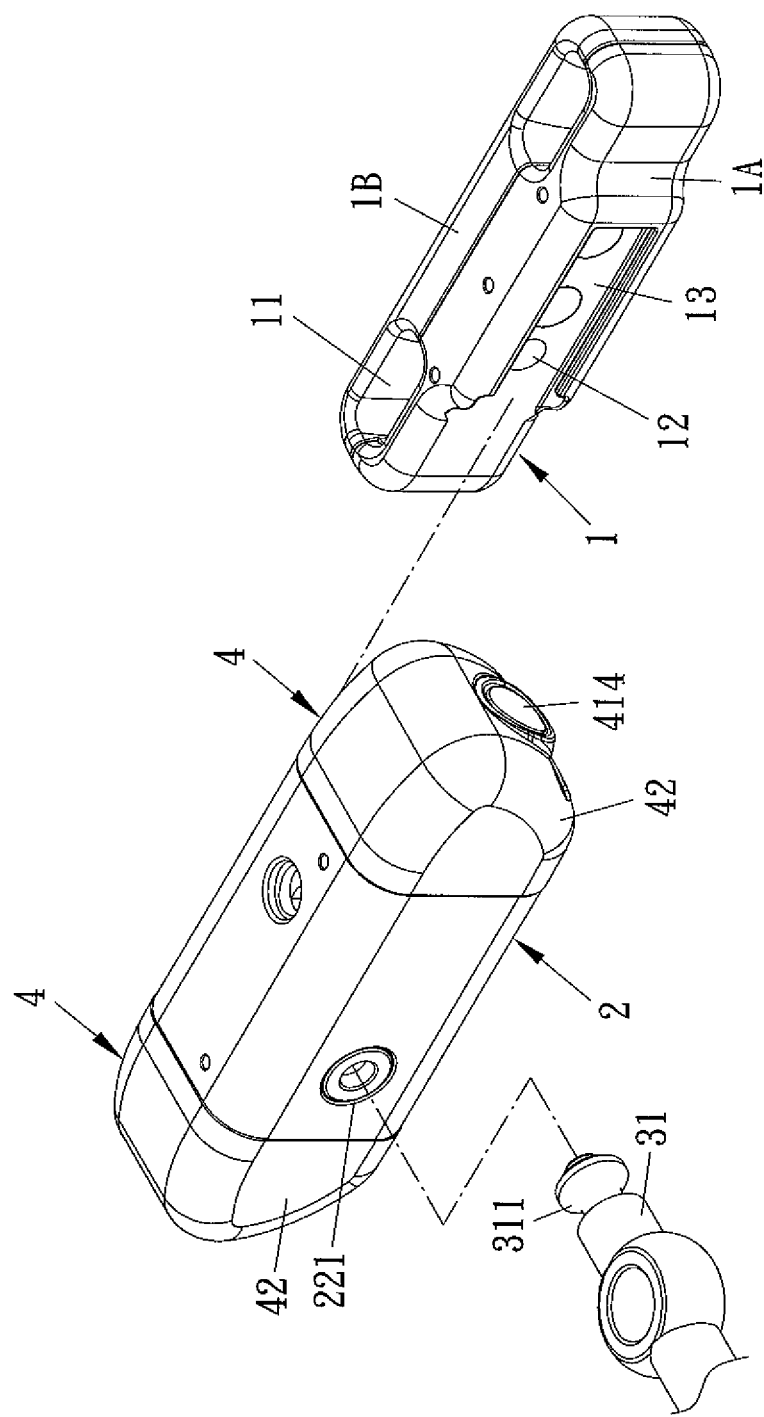
FIG. 2 is a perspective view showing the exploded components of the locking structure for the bicycle in accordance with the preferred embodiment of the present invention.
Figure 3:
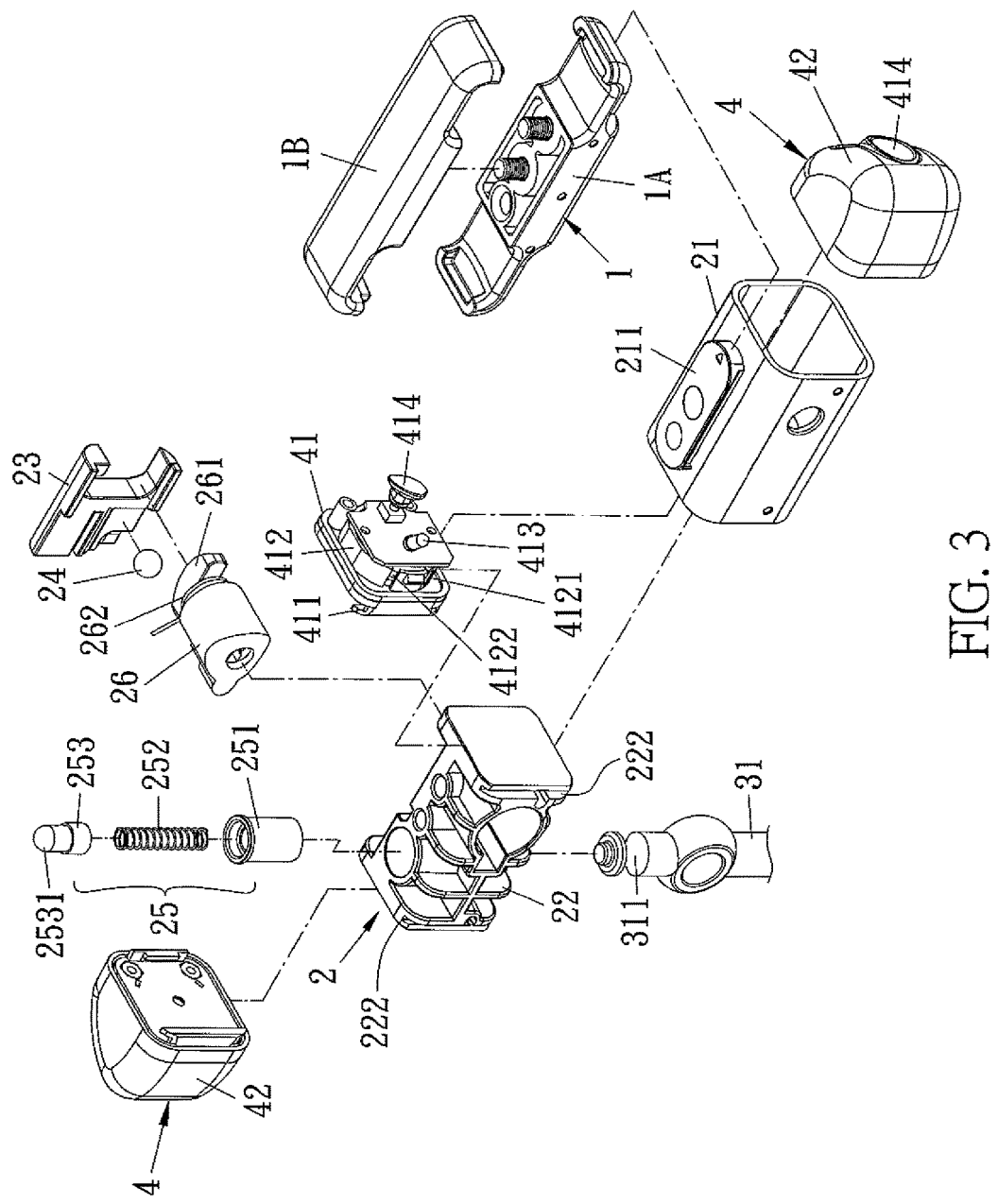
FIG. 3 is another perspective view showing the exploded components of the locking structure for the bicycle in accordance with the preferred embodiment of the present invention.
Figure 4:
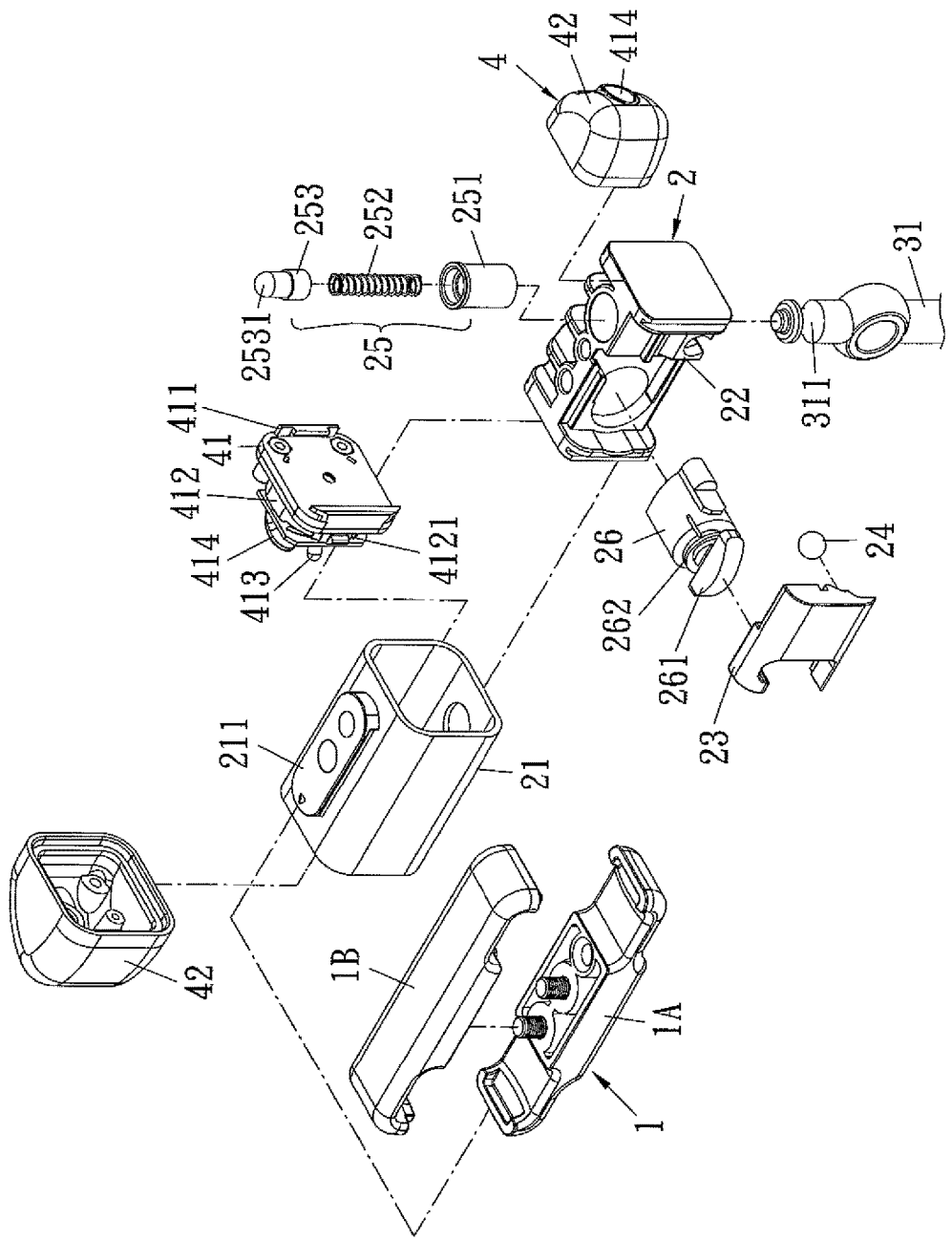
FIG. 4 is also another perspective view showing the exploded components of the locking structure for the bicycle in accordance with the preferred embodiment of the present invention.
Figure 5:
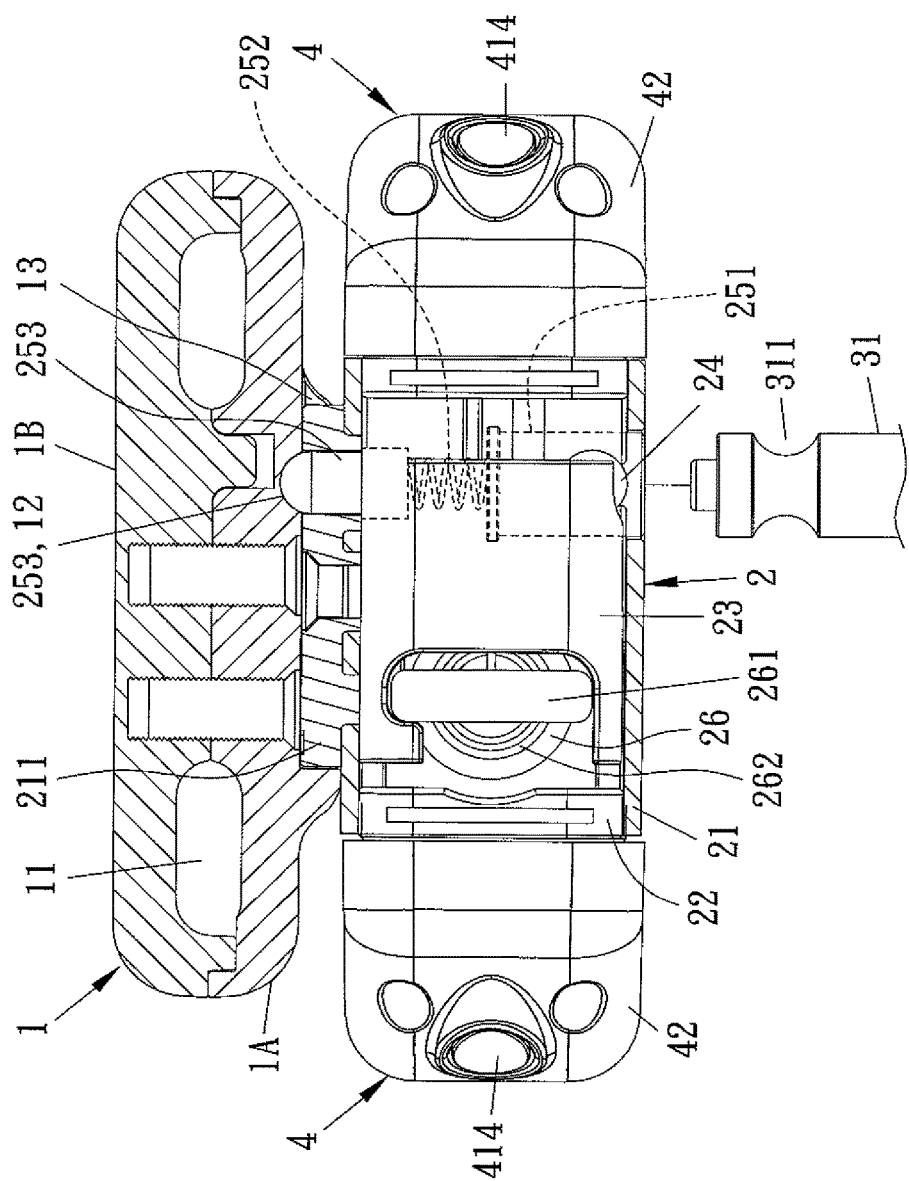
FIG. 5 is a cross sectional view showing the assembly of a locking member and a fixing mount of the locking structure for the bicycle in accordance with the preferred embodiment of the present invention.
Figure 6:
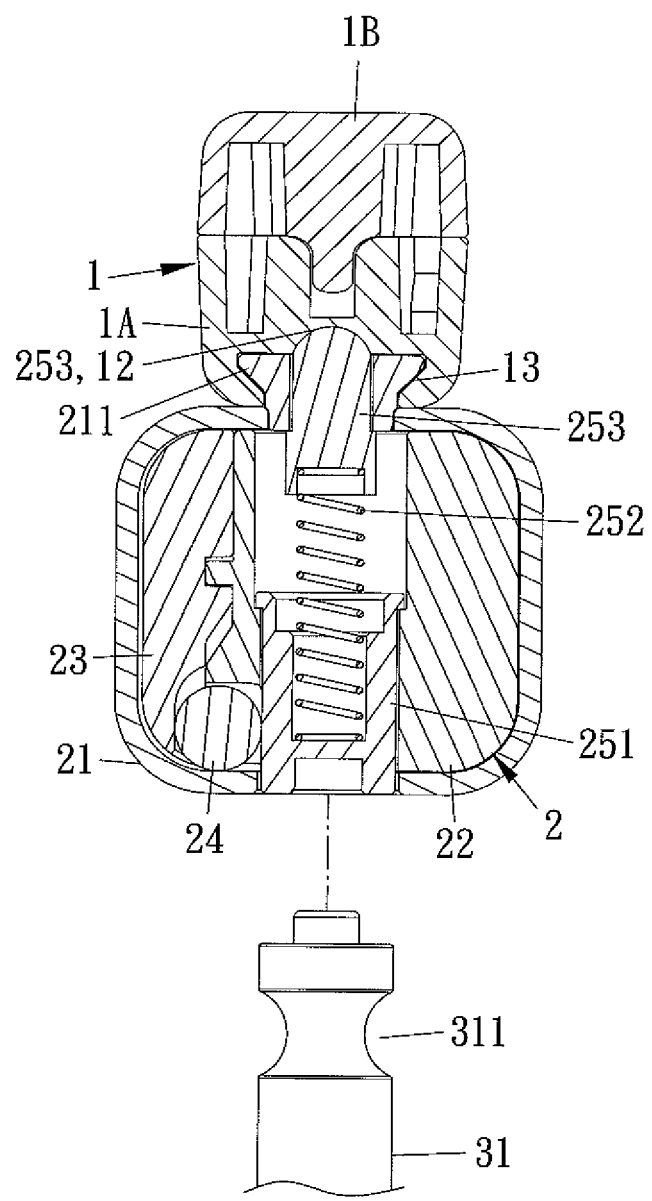
FIG. 6 is another cross sectional view showing the assembly of the locking member and the fixing mount of the locking structure for the bicycle in accordance with the preferred embodiment of the present invention.
Figure 7:
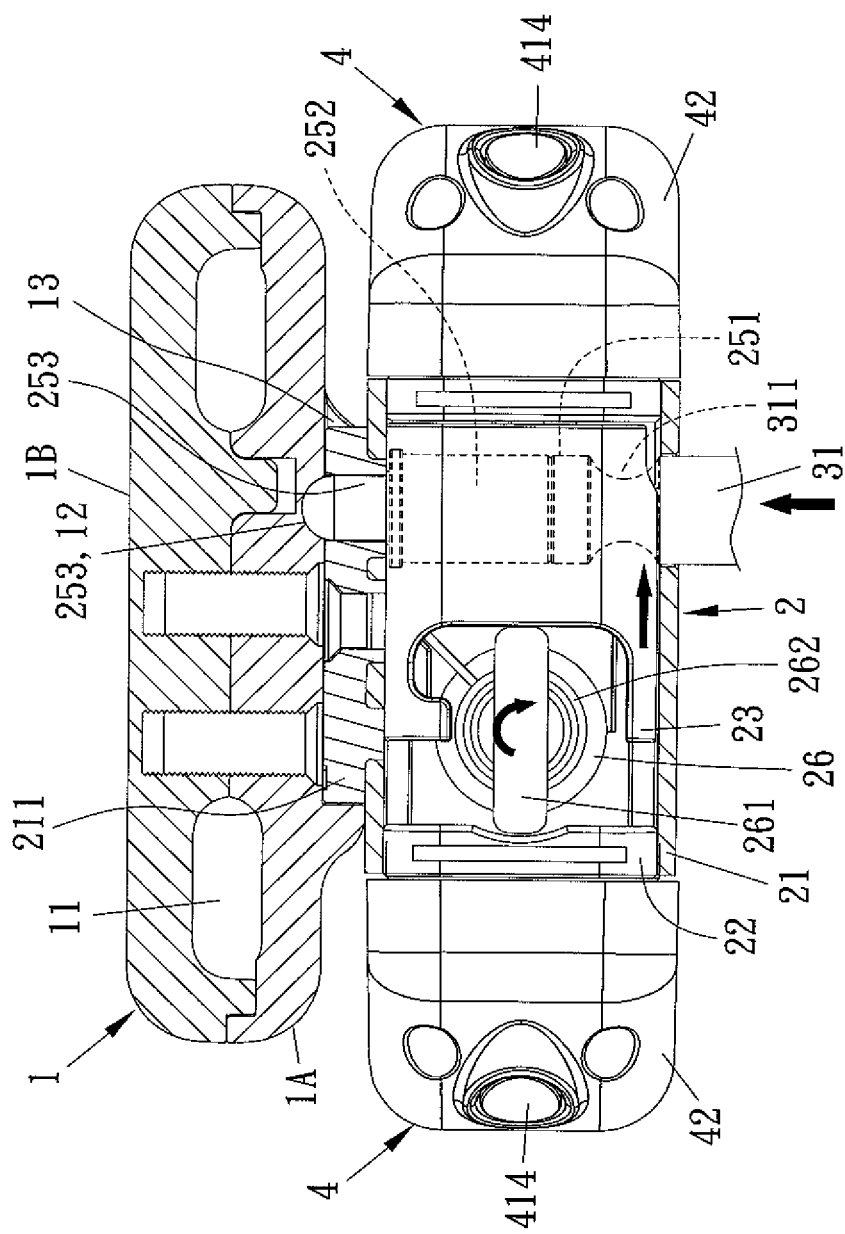
FIG. 7 is a cross sectional view showing the operation of the locking structure for the bicycle in accordance with the preferred embodiment of the present invention.
Figure 8:
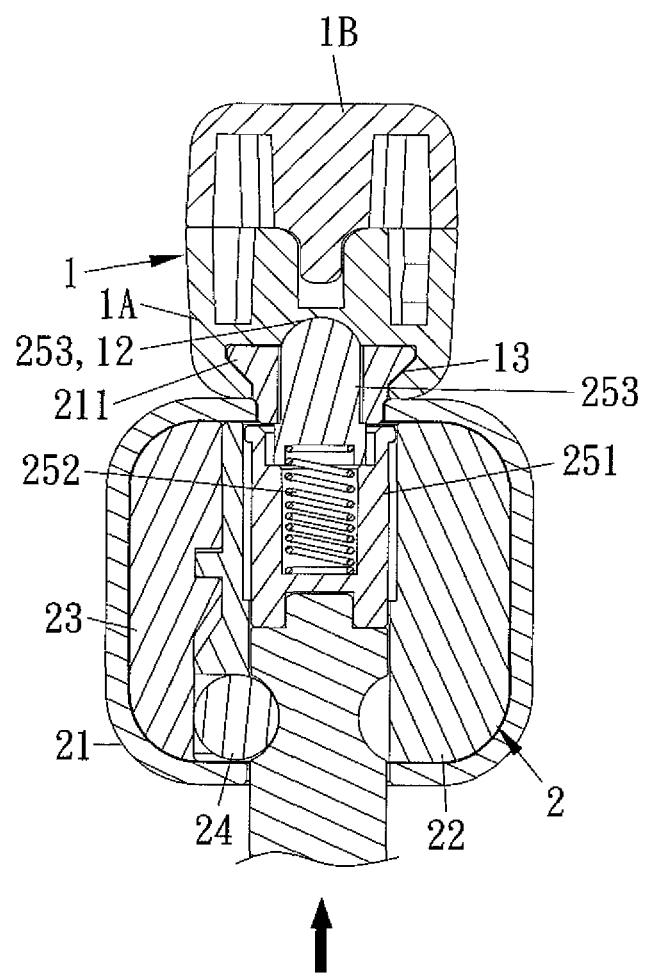
FIG. 8 is another cross sectional view showing the operation of the locking structure for the bicycle in accordance with the preferred embodiment of the present invention.

The present invention will be clearer from the following description when viewed together with the accompanying drawings, which show, for purpose of illustration only, the preferred embodiments in accordance with the present invention.

Referring to FIGS. 1-6, a locking structure for a bicycle according to a preferred embodiment of the present invention comprises: a fixing mount 1, a locking member 2, a flexible strip 3, and two light assemblies 4.

The fixing mount 1 includes at least one orifice 11, a recessed portion 12, and a first connecting portion 13. In this embodiment, the fixing mount 1 includes two orifices 11. The fixing mount 1 is comprised of a first part 1A and a second part 1B connecting with the first part 1A, and the at least one orifice 11 is defined between the first part 1A and the second part 1B. The recessed portion 12 is arcuate and is formed on the first part 1A, and the first connecting portion 13 is arranged on the first part 1A.

The locking member 2 includes a housing 21 in which a lock block 22, a driving piece 23, a ball 24, and a retaining unit 25 are accommodated, wherein the housing 21 has a second connecting portion 211 for mating with the first connecting portion 13. In this embodiment, the first connecting portion 13 is a sliding groove, and the second connecting portion 211 is a slidable protrusion, the lock block 22 inserts in the housing 21 and has a cylinder core 26, an aperture 221, and two female matching units 222 (in this embodiment, each female matching unit 222 is a slot), the cylinder core 26 has an actuation projection 261 and a torsion spring 262. The actuation projection 261 rotates to a unlock position from a lock position so as to be against a recovery force of the torsion spring 262, and the torsion spring 262 drives the actuation projection 261 to move back to the lock position. The two female matching units 222 are arranged on two opposite sides of the lock block 22 respectively. The driving piece 23 revolves with the actuation projection 261 and is driven to slide horizontally between an engagement position and a disengagement position, and the ball 24 horizontally slides to the engagement position with the driving piece 23 so as to be retained in the aperture 221 or the ball 24 removes from the aperture 221, when the driving piece 23 horizontally slides to the disengagement position, hence the ball 24 removes from the aperture 221.

The retaining unit 25 is accommodated in the aperture 221 of the lock block 22 and has a fitting sleeve 251, a spring 252, and an affix bolt 253, wherein the fitting sleeve 251 and the affix bolt 253 slide in the aperture 221, the spring 252 abuts against the fitting sleeve 251 and the affix bolt 253, and the affix bolt 253 has an arcuate head 2531, hence the spring 252 pushes the affix bolt 253 to extend out of the aperture 221 and moves into the recessed portion 12 via the housing 21.

Figure 11:
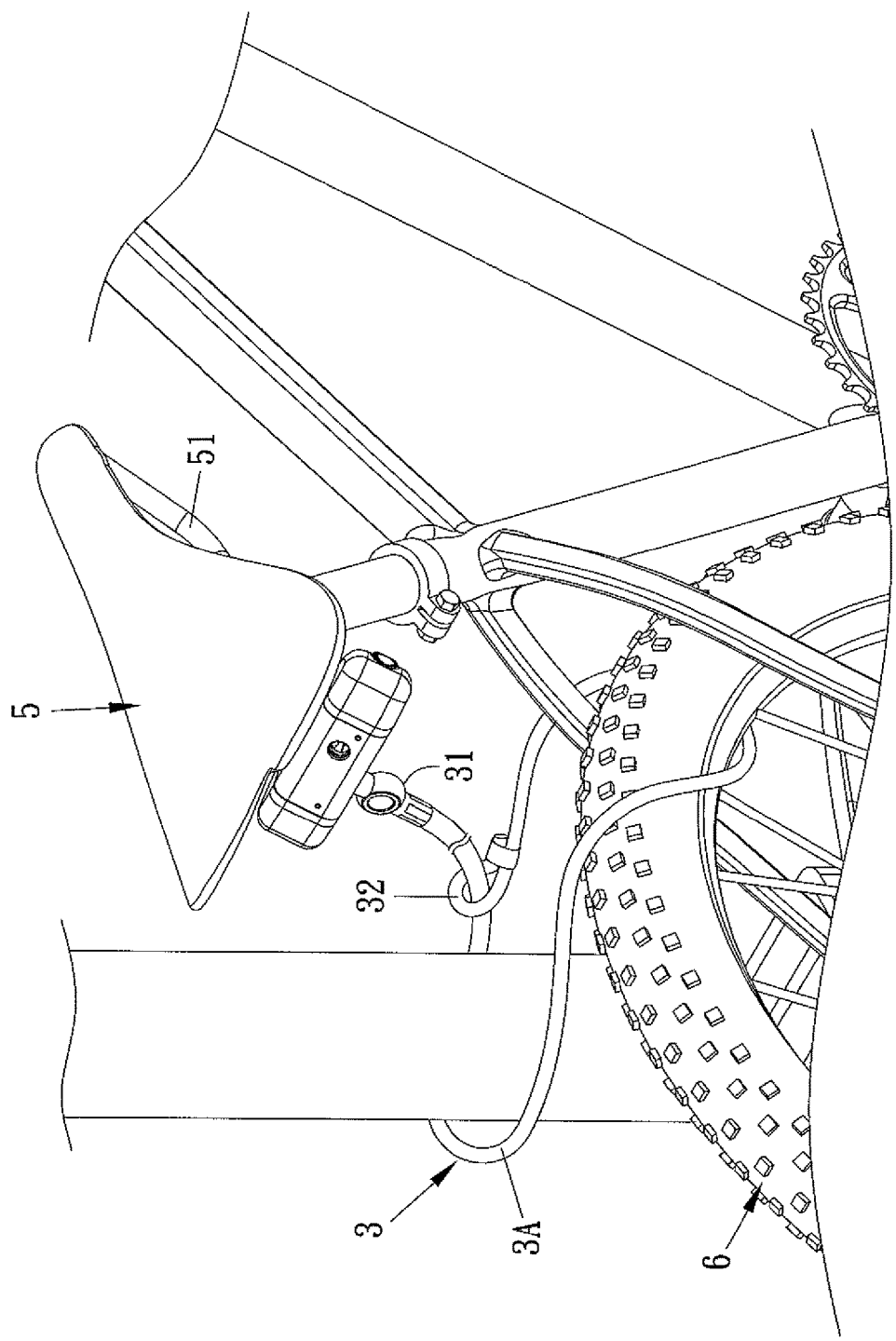
FIG. 11 is a perspective view showing the application of the locking structure for the bicycle in accordance with the preferred embodiment of the present invention.
Figure 12:
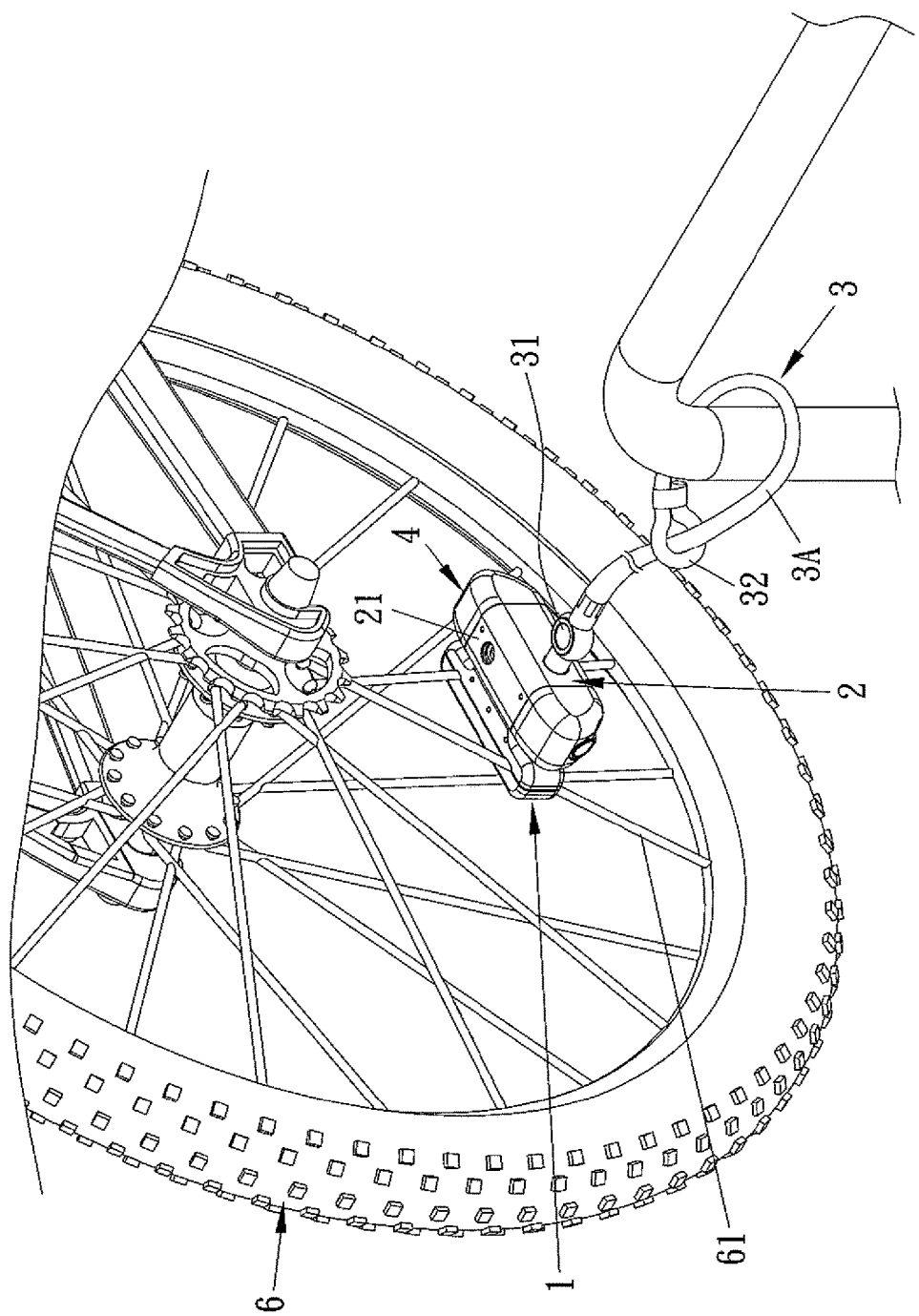
FIG. 12 is another perspective view showing the application of the locking structure for the bicycle in accordance with the preferred embodiment of the present invention.
Figure 13:
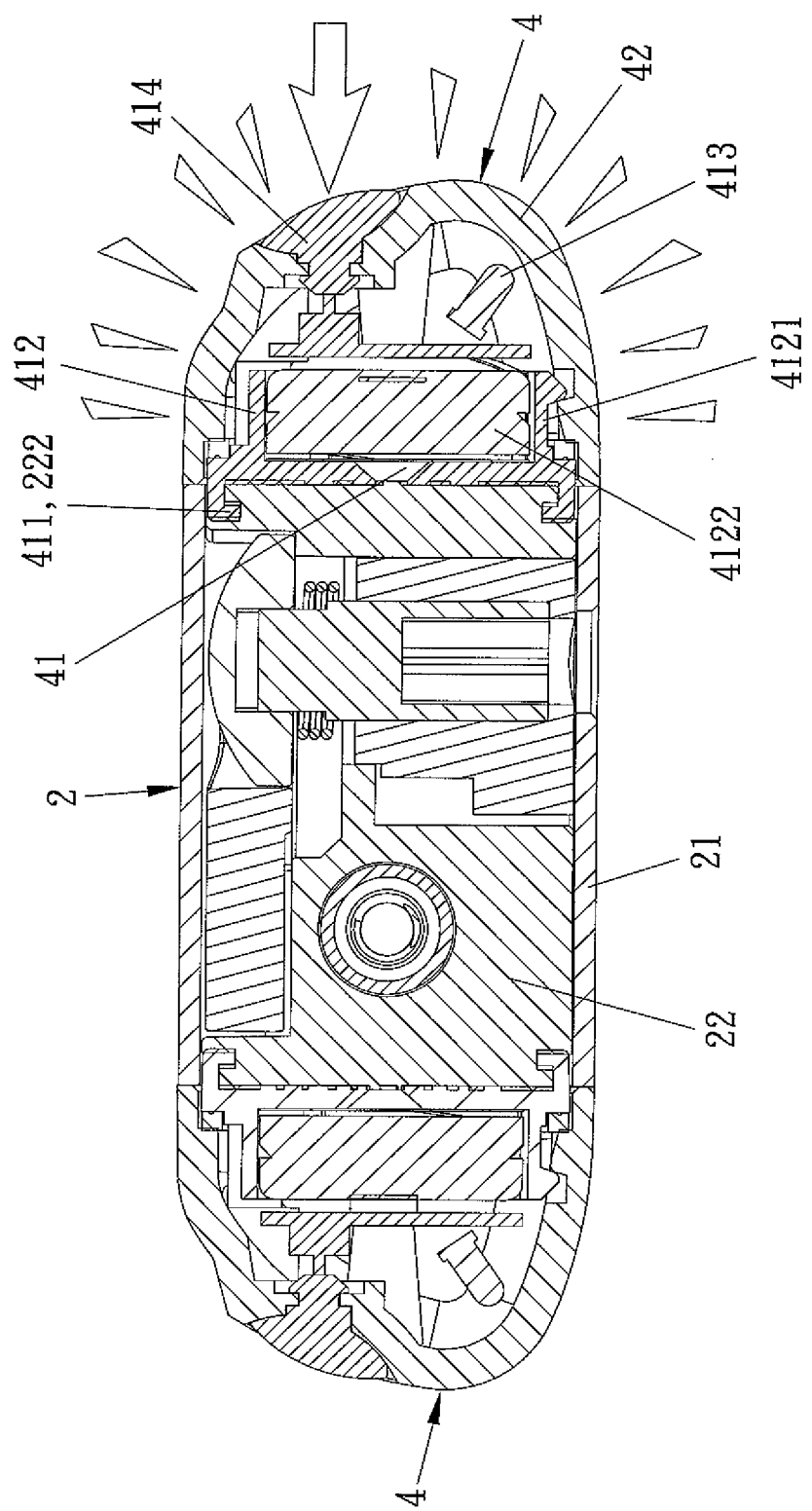
FIG. 13 is a cross sectional view showing the assembly of two light assemblies of the locking structure for the bicycle in accordance with the preferred embodiment of the present invention.

The flexible strip 3 with a predetermined length is a steel cable (or a chain), and the flexible strip 3 includes a coupling bolt 31 arranged on a first end thereof and a loop 32 disposed on a second end thereof, wherein the coupling bolt 31 has a peripheral trench 311 configured to accommodate a positioning ring 3A, as shown in FIGS. 11 and 13, the coupling bolt 31 inserts into the aperture 221 of the lock block 22 from the housing 21 so as to push the fitting sleeve 251 of the retaining unit 25 to press the spring 252 and to retain with the affix bolt 253, and the affix bolt 253 is stopped by the fitting sleeve 251. In the meantime, the ball 24 is pushed by the torsion spring 262 to move into the peripheral trench 311 of the coupling bolt 31 and is limited by the driving piece 23 after the actuation projection 261 rotates and the driving piece 23 slides, hence the coupling bolt 31 is locked in the aperture 221 and the coupling bolt 31 retains with the affix bolt 253, thus locking the affix bolt 253 locked with the fixing mount 1. After the actuation projection 261 rotates to the unlock position, the spring 252 pushes the coupling bolt 31 out of the aperture 221 via the fitting sleeve 251, and the ball 24 is removed from the aperture 221.

Each light assembly 4 includes a mounting seat 41 and a casing 42. The mounting seat 41 has a male matching unit 411 (in this embodiment, the male matching unit 411 is a rail), a power unit 412, at least one light emitting element 413, and a control switch 414. The male matching unit 411 retains with each female matching unit 222 of the lock block 22, the lock block 22 inserts into the housing 21, and the housing 21 limits the male matching unit 411 of the mounting seat 41 and each female matching unit 222 of the lock block 22, such that each light assembly 4 is in connection with the locking member 2. The power unit 412 has a cell case 4121 in which a cell 4122 is housed to supply power to the at least one light emitting element 413. The control switch 414 is configured to control the power unit 412 to supply the power, and the casing 42 is covered on the mounting seat 41. The control switch 414 exposes outside the casing 42.

In operation, as shown in FIGS. 7, 8, 11 and 12, the fixing mount 1 is fixed on detachable parts (such as a bottom support 51 of a bicycle saddle 5 and a spoke 61 of a wheel 6) of the bicycle by using the at least one orifice 11. As desiring to lock the bicycle, the housing 21 is connected with the fixing mount 1 by way of the first connecting portion 13 and the second connecting portion 211, so that the affix bolt 253 of the retaining unit 25 is pushed by the spring 252, and the arcuate head 2531 inserts into and locks in the recessed portion 12 of the fixing mount 1, thereafter the 5 coupling bolt 31 of the flexible strip 3 inserts through the loop 32 so that the flexible strip 3 forms the positioning ring 3A, wherein the positioning ring 3A surrounds one of two wheels (such as a front wheel and a rear wheel) of the bicycle and a fix post, the coupling bolt 31 inserts into the aperture 221 of the lock block 22 via the housing 21. Before inserting the coupling bolt 31 into the aperture 221, the fitting sleeve 251 of the retaining unit 25 is pushed by the spring 252 to move downwardly and to be limited below the aperture 221, and the ball 24 is stopped moving into the aperture 211 once more after removing from the aperture 221. When the coupling bolt 31 pushes the fitting sleeve 251 upwardly to press the spring 252 and to align with the ball 24 in the peripheral trench 311, the ball 24 is pushed by the torsion spring 262 via the actuation projection 261 and the driving piece 23 so as to retain in the peripheral trench 311, hence the coupling bolt 31 locks in the aperture 221, and the coupling bolt 31 abuts against the affix bolt 253 via the fitting sleeve 251, the arcuate head 2531 of the affix bolt 253 locks in the recessed portion 12 of the fixing mount 1, and the locking member 2 is in connection with the fixing mount 1, thus locking the bicycle saddle 5, the wheel 6 or detachable parts of the bicycle to avoid being stolen.

Figure 9:
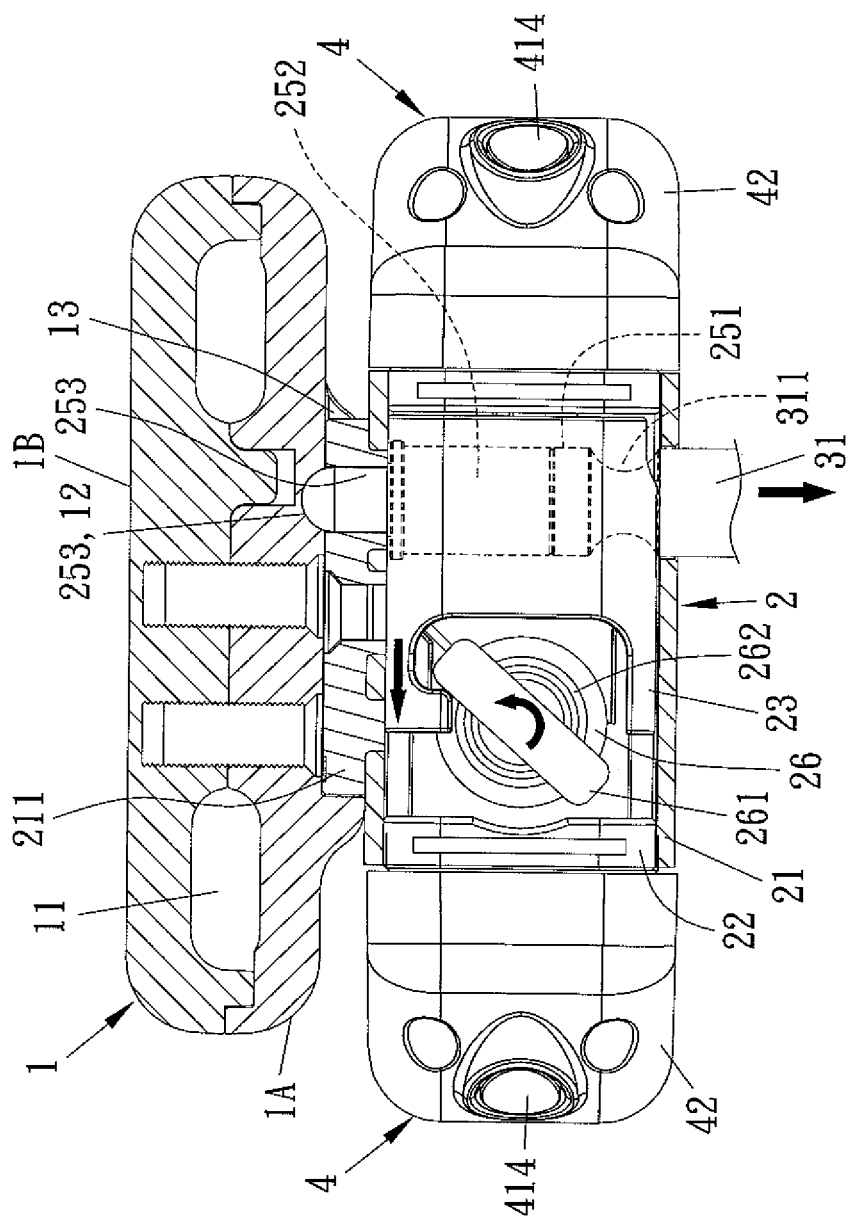
FIG. 9 is also another cross sectional view showing the operation of the locking structure for the bicycle in accordance with the preferred embodiment of the present invention.
Figure 10:
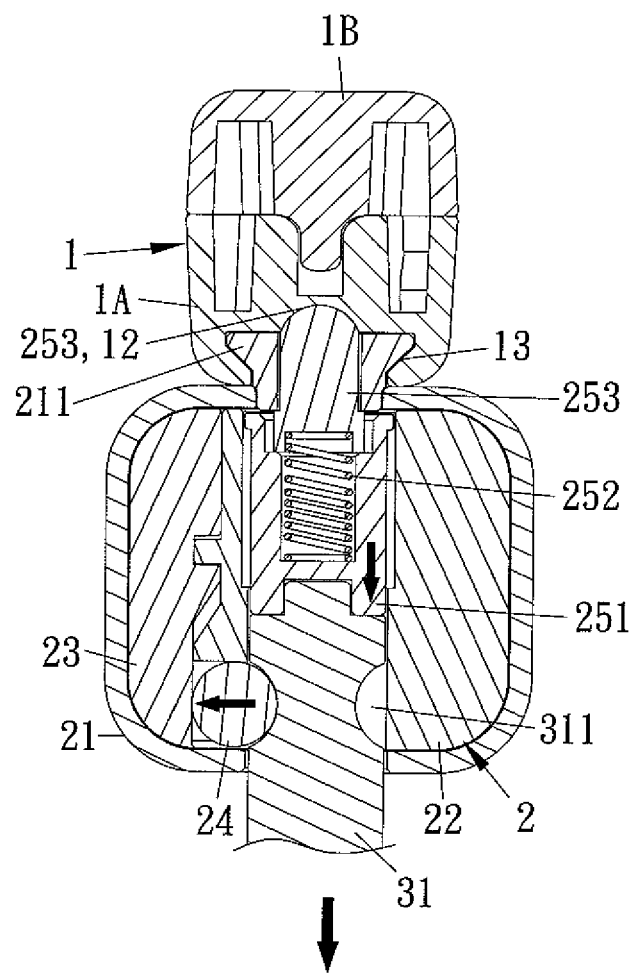
FIG. 10 is still another cross sectional view showing the operation of the locking structure for the bicycle in accordance with the preferred embodiment of the present invention.

Referring to FIGS. 9 and 10, as desiring to unlock the bicycle, a key is inserted into the cylinder core 26 and is rotated so as to be against the torsion spring 262, and the actuation projection 261 rotates to the unlock position from the lock position so as to drive the driving piece 23 to horizontally slide to the disengagement position from the engagement position, thus removing the ball 24. Thereafter, the ball 24 is removed from the aperture 221, and the spring 252 pushes the coupling bolt 31 to move downwardly along the fitting sleeve 251 so as to abut against the ball 24, and the ball 24 removes from the aperture 221 and the peripheral trench 311 of the coupling bolt 31. In the meantime, the spring 252 pushes the coupling bolt 31 to remove from the aperture 221, and the fitting sleeve 251 is pushed by the spring 252 to move back an original position. Thereby, the fitting sleeve 251 contacts with the ball 24 so that the ball 124 is not be pushed to move into the aperture 221, and the affix bolt 253 is removed to flexibly move inward. Preferably, the second connecting portion 211 of the housing 21 is slid away from the first connecting portion 13 of the fixing mount 1 so that the arcuate head 2531 of the affix bolt 253 removes from the recessed portion 12 of the fixing mount 1, thus removing the locking member 2 from the fixing mount 1 so as to unlock the bicycle.

Figure 14:
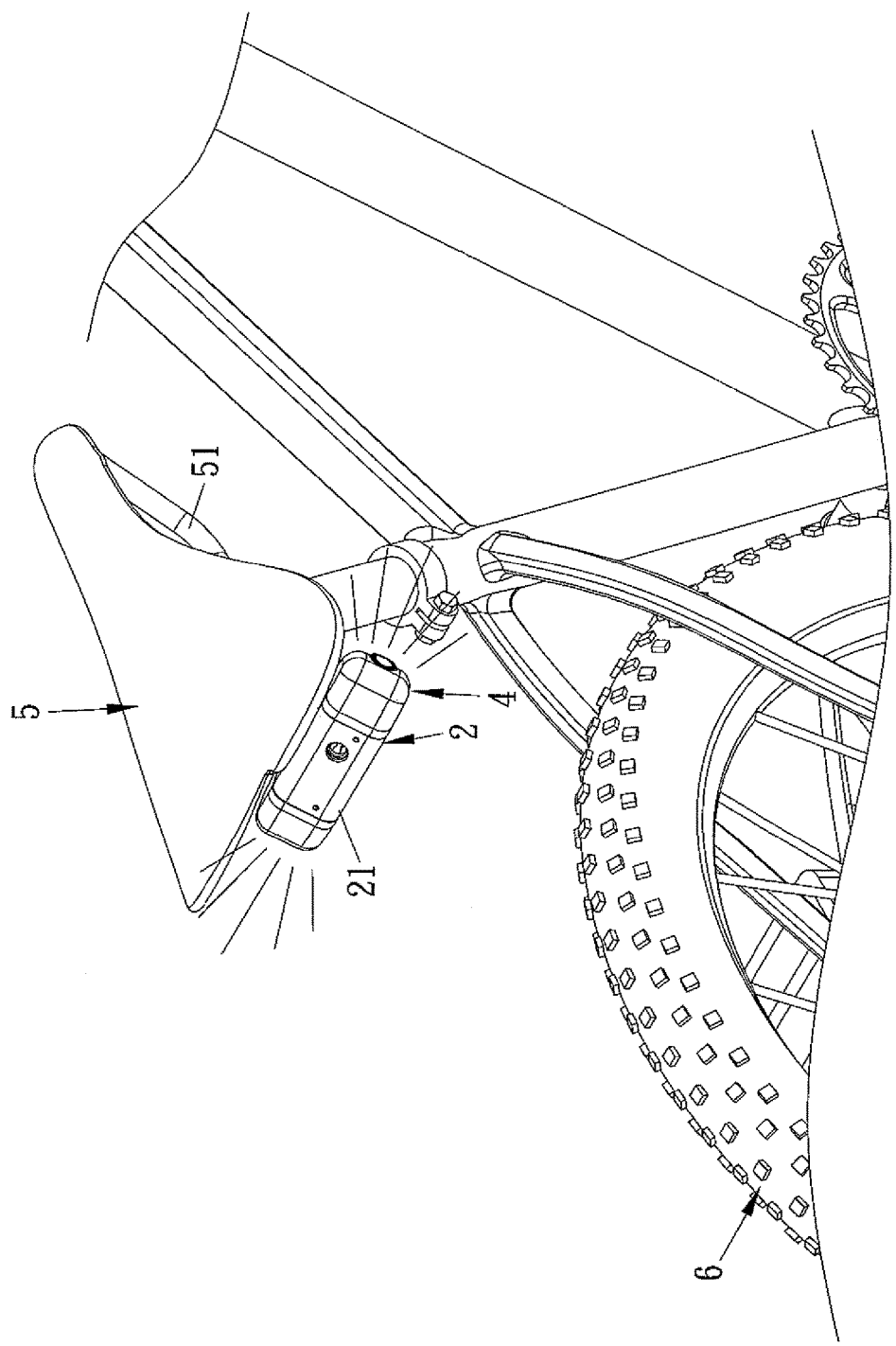
FIG. 14 is a perspective view showing the application of the two light assemblies of the locking structure for the bicycle in accordance with the preferred embodiment of the present invention.

Referring further to FIGS. 13 and 14, in operation, the control switch 414 of the mounting seat 41 is pressed to drive the power unit 412 to supply the power to the at least one light emitting element 413 of the mounting seat 41, thus emitting lights and making alert.

Figure 15:
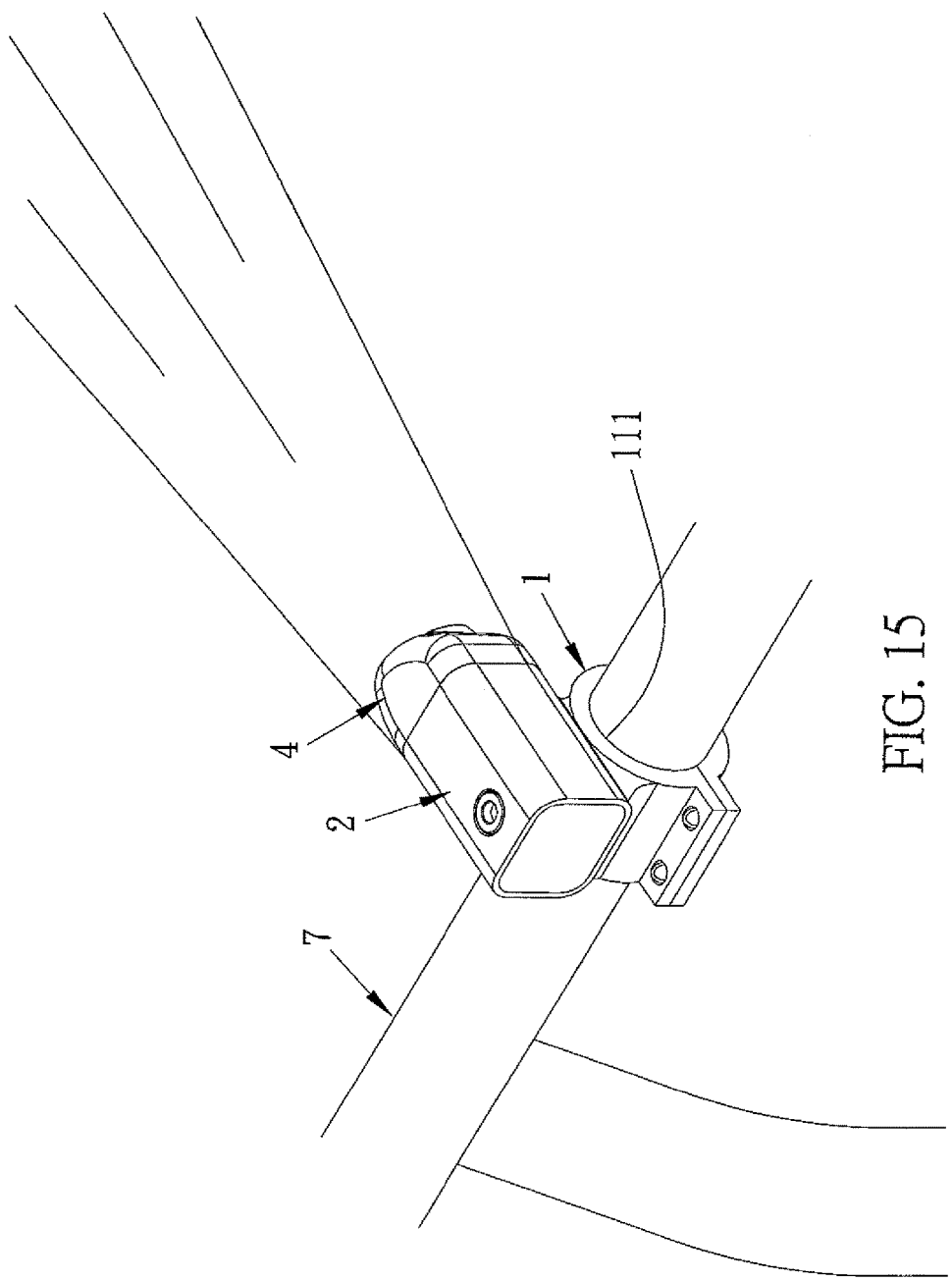
FIG. 15 is a perspective view showing the application of a light assembly of a locking structure for a bicycle in accordance with another preferred embodiment of the present invention.

Preferably, the locking member 2 solely mates with the flexible strip 3. With reference to FIG. 15, the fixing mount 1 includes a C-shaped retainer 111, and the lock block 22 of the locking member 2 has a female matching unit 222 fixed on one side thereof, such that the C-shaped retainer 111 of the fixing mount 1 clamps on a handlebar 7, a seat post, or a bicycle frame.

Accordingly, the locking structure of the present invention has advantages as follows:

1. The locking structure comprises the fixing mount 1 configured to be selectively fixed on the detachable parts of the bicycle, and the locking member 2 is in connection with the fixing mount 1 easily. The flexible strip 3 surrounds the two wheels of the bicycle and the fix post to fix the bicycle and the detachable parts and to avoid the theft of the bicycle.

2. The fixing mount 1 is fixed on the bicycle saddle 5, the wheel 6 or detachable parts of the bicycle and is connected with or removed from the locking member 2 easily.

3. Each light assembly 4 is in connection with the locking member 2, and the locking member 2 is locked with the fixing mount 1 by using the cylinder core 26, so that the fixing mount 1 is mounted on the bicycle. Hence, each light assembly 4 makes alert and illuminates the lights, and the bicycle is locked by using the locking member 2 and the flexible strip 3 to obtain anti-theft, illumination, and aesthetics appearance.

4. Each light assembly 4 is in connection with the locking member 2 to enhance the anti-theft of each light assembly 4.

While various embodiments in accordance with the present invention have been shown and described, it is clear to those skilled in the art that further embodiments may be made without departing from the scope of the present invention.

What is claimed is:

1. A locking structure for a bicycle comprising:
a fixing mount comprised of a first part and a second part connecting with the first part, and the fixing mount including at least one orifice, a recessed portion, and a first connecting portion, the fixing mount being fixed on detachable parts of a bicycle;
a locking member including a housing in which a lock block, a retaining unit, a ball, and a retaining unit are accommodated, the housing having a second connecting portion for mating with the first connecting portion, the housing being connected with the fixing mount by way of the first connecting portion and the second connecting portion, the lock block having a cylinder core and an aperture, the cylinder core has an actuation projection and a torsion spring, wherein the actuation projection rotates to a unlock position from a lock position so as to be against a recovery force of the torsion spring, and the torsion spring drives the actuation projection to move back to the lock position, the driving piece revolves with the actuation projection and is driven to slide horizontally between an engagement position and a disengagement position; and the ball horizontally slides to the engagement position with the driving piece so as to be retained in the aperture or the ball removes from the aperture; the retaining unit is accommodated in the aperture of the lock block and has a fitting sleeve, a spring, and an affix bolt, wherein the fitting sleeve and the affix bolt slide in the aperture, the spring abuts against the fitting sleeve and the affix bolt, hence the spring pushes the affix bolt to extend out of the aperture and moves into the recessed portion via the housing;
a flexible strap with a predetermined length, and the flexible strap including a coupling bolt arranged on a first end thereof and a loop disposed on a second end thereof, the coupling bolt has a peripheral trench configured to accommodate a positioning ring; the coupling bolt inserts into the aperture of the lock block from the housing so as to push the fitting sleeve of the retaining unit to press the spring and to retain with the affix bolt, and the affix bolt is stopped by the fitting sleeve, wherein the ball is pushed by the torsion spring to move into the peripheral trench of the coupling bolt and is limited by the driving piece after the actuation projection rotates and the driving piece slides, hence the coupling bolt is locked in the aperture and the coupling bolt retains with the affix bolt 3, thus locking the affix bolt locked with the fixing mount; after the actuation projection rotates to the unlock position, the spring pushes the coupling bolt out of the aperture via the fitting sleeve, and the ball is removed from the aperture.

2. The locking structure for the bicycle as claimed in claim 1, wherein the at least one orifice is defined between the first part and the second part, and the recessed portion and the first connecting portion are arranged on the first part; the first connecting portion is a sliding groove, and the second connecting portion is a slidable protrusion.

3. The locking structure for the bicycle as claimed in claim 1, wherein the recessed portion is arcuate; and the affix bolt has an arcuate head.

4. The locking structure for the bicycle as claimed in claim 1, wherein the lock block further has a female matching unit arranged on at least one of two sides of thereof so as to connect with each light assembly, wherein each light assembly includes a mounting seat, and the mounting seat has a male matching unit, a power unit, at least one light emitting element, and a control switch, the male matching unit of the mounting seat retains with the female matching unit of the lock block so as to fix each light assembly and the locking member together, the power unit is configured to supply power to the at least one light emitting element, and the control switch is configured to control the power unit to supply the power.

5. The locking structure for the bicycle as claimed in claim 4, wherein the male matching unit of the mounting seat is a rail, and the female matching unit is a slot, the male matching unit of the mounting seat retains with the female matching unit of the lock block, the lock block inserts into the housing, and the housing limits the male matching unit of the mounting seat and the female matching unit of the lock block.

6. The locking structure for the bicycle as claimed in claim 4, wherein each light assembly further includes a casing covered on the mounting seat, and the control switch of the mounting seat exposes outside the casing.

* * * * *